(12) United States Patent
Prouvost et al.

(10) Patent No.: US 7,884,951 B2
(45) Date of Patent: Feb. 8, 2011

(54) APPARATUS FOR MEASURING AN INTERNAL DIMENSION OF A WELL BORE

(75) Inventors: Laurent Prouvost, Ambares-et-Lagrave (FR); Frederique Kalb, Hjellestad (NO); Carolina Dautriche, Chatenay-Malabry (FR); Pierre Mouget, Sevres (FR); Christine Aussibal, Villebon sur Yvette (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 210 days.

(21) Appl. No.: 11/575,374

(22) PCT Filed: Sep. 20, 2005

(86) PCT No.: PCT/EP2005/010242

§ 371 (c)(1),
(2), (4) Date: May 22, 2008

(87) PCT Pub. No.: WO2006/032490

PCT Pub. Date: Mar. 30, 2006

(65) Prior Publication Data
US 2008/0266577 A1 Oct. 30, 2008

(30) Foreign Application Priority Data
Sep. 22, 2004 (EP) ................... 04292279

(51) Int. Cl.
*G01B 11/00* (2006.01)
(52) U.S. Cl. ..................... 356/626; 356/625
(58) Field of Classification Search .......... 356/625–636, 356/612; 73/152.52–152.53, 1.22, 1.41, 73/1.45, 1.56, 1.85, 61.48, 61.69, 64.43, 73/114.09, 170.06, 514.26; 250/227.14, 250/227.24; 166/255.1, 66, 250.11
See application file for complete search history.

(56) References Cited

U.S. PATENT DOCUMENTS

| 2,994,962 A | 12/1957 | Lebourg |
| 6,305,227 B1 | 10/2001 | Wu et al. |
| 2003/0164952 A1* | 9/2003 | Deichmann et al. ......... 356/603 |
| 2004/0140092 A1* | 7/2004 | Robison .................. 166/255.1 |

FOREIGN PATENT DOCUMENTS

GB 2329722 3/1999

* cited by examiner

*Primary Examiner*—Gregory J Toatley, Jr.
*Assistant Examiner*—Tri T Ton
(74) *Attorney, Agent, or Firm*—Matthias Abrell

(57) ABSTRACT

An apparatus for measuring an internal dimension of a wellbore comprising a tool adapted to be positioned inside the well bore. The tool comprises an optical caliper comprising an optical sensor providing a response correlated to the internal dimension of the well bore, the optical sensor being coupled to an optical fiber.

5 Claims, 4 Drawing Sheets

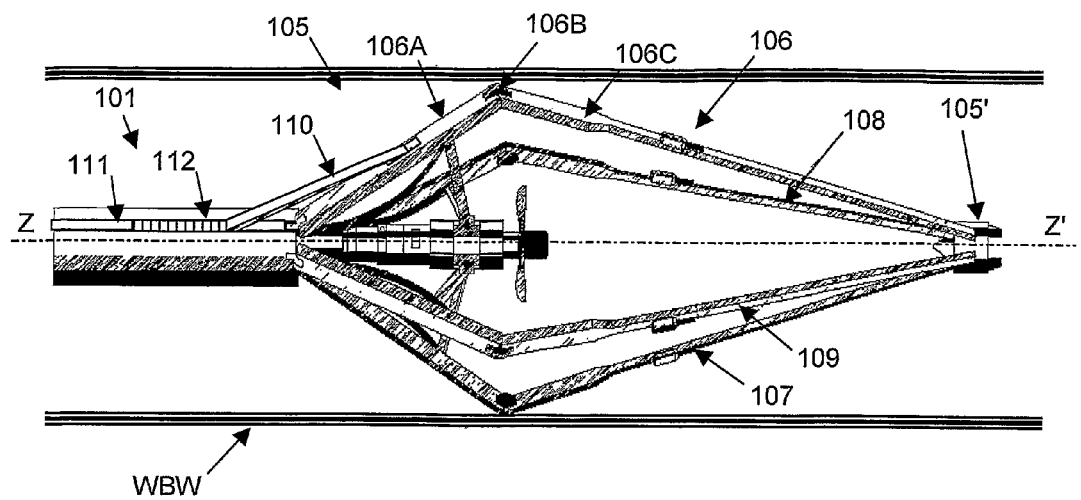
Figure 2.A
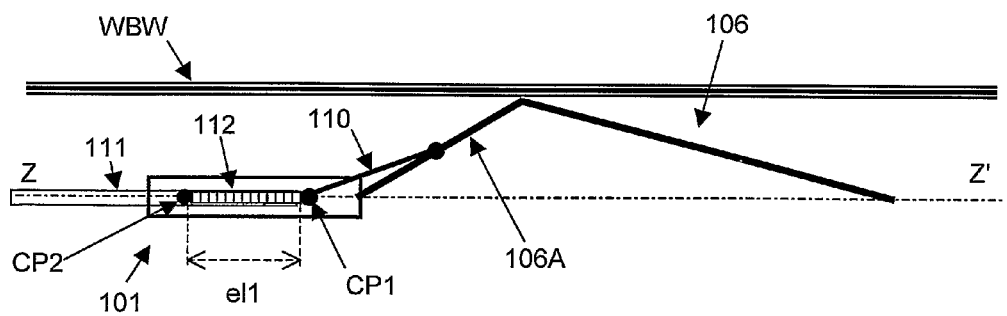
Figure 2.B
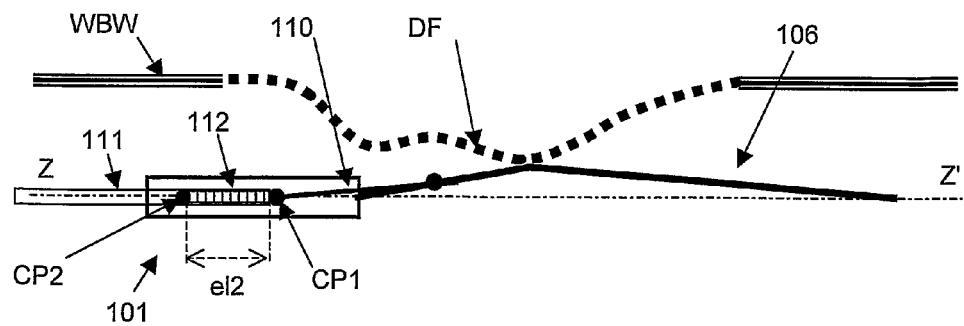
Figure 2.C

APPARATUS FOR MEASURING AN INTERNAL DIMENSION OF A WELL BORE

FIELD OF THE INVENTION

The invention relates to an apparatus for measuring an internal dimension of a pipe. A particular application of the measuring apparatus of the invention in the oilfield industry relates to the measurement of the internal dimension of a hydrocarbon well-bore.

BACKGROUND OF THE INVENTION

After a hydrocarbon well has been drilled and made safe, well logging operation are generally carried out. The well logging operation serves to measure various parameters of the hydrocarbon well geological formation (e.g. resistivity, porosity, etc . . . at different depths) and in the well-bore (e.g. temperature, pressure, fluid type, fluid flowrate, etc. . . . at different depths). Such measurements are performed by a logging tool. Generally, a logging tool comprises at least one sensor (e.g. resistivity sonde, mechanical sonde, gamma ray neutron sonde, accelerometer, pressure sensor, temperature sensor, etc. . . . ) and measures at least one parameter. It may include a plurality of same or different sensors sensitive to one or more parameters.

The dimension of the well-bore all along the bore is an important parameter for the following reasons.

Firstly, after the hydrocarbon well has been drilled, the well-bore is an open borehole filled with the drilling mud. Generally, the well-bore is cased by cementing operations. In order to correctly plan the cementing operations, the drilling engineers need measurement of the well-bore dimension as a qualitative indication of both the condition of the well-bore and the degree to which the drilling mud has maintained the borehole stability.

Secondly, when the borehole is cased (also known as casing) or tubed (also known as tubing), logging tools are moved up and down in the borehole for gathering data about the various parameters. In order to avoid blocking the logging tools in the borehole, the logging operations require a borehole of sufficient diameter. Thus, the logging engineers need measurement of the well-bore dimension as a qualitative indication of the potential deformations, rugosity or corrosion of the borehole wall.

Thirdly, a well-bore dimension measurement combined with others measurements may be used to determine others characteristic values of the well. For example, the well-bore dimension and a fluid speed measurement (for instance by a spinner) enables to calculate the flowrate of the fluid flowing in the well-bore.

In current logging tools, the measurement of the diameter of a tubing or casing is based on electromechanical devices or ultra-sonic device, also known as caliper. The electromechanical caliper transforms the radial opening of a mechanical arm into a translation movement, which is detected by at least one linear variable differential transformer (LVDT), and provides the dimensions of the completion in one or two directions. A plurality of calipers may also be used to provide multi-point measurements of a tubing or casing (also known as a multi-arm or multi-finger caliper).

The ultra-sonic caliper measures the internal diameter of a casing or tubing using high-frequency acoustic signals. A transducer (in transmit mode) emits a high-frequency pulse that is reflected by the casing or tubing wall back to the transducer (in receive mode). The diameter is determined from the time of flight of this echo and the fluid acoustic velocity. The transducer may be rotated to produce a cross section of the borehole size and full-coverage images of the borehole wall.

Both types of caliper coupled to an appropriate acquisition system provide a caliper log that is a representation of the measured diameter of a borehole along its depth. The electromechanical and ultra-sonic calipers involve electronic system that shows reliability issues when used in harsh environment (high temperature or pressure which are common downhole).

SUMMARY OF THE INVENTION

One goal of the invention is to propose an apparatus for measuring the internal dimension of a well-bore that is more reliable in harsh condition than prior art caliper. According to the invention, the measurement apparatus is an optical caliper comprising an optical sensor providing a response correlated to the internal dimension of the well-bore, the optical sensor being coupled to an optical fiber. According to a first embodiment of the present invention, the optical sensor comprises a Bragg grating coupled to a caliper arm in contact with the wall of the well-bore.

According to a first alternative of the first embodiment, the dimension measurement involves a Bragg grating working in elongation/compression due to the movement of a caliper arm. More precisely, the apparatus comprises:

- at least an arm in contact with an internal wall of the well-bore,
- an optical sensor comprising a Bragg grating inscribed in a portion of the optical fiber, the arm being coupled to the portion of the optical fiber by a first coupling point so that a movement of the arm elongates/compresses the portion of the optical fiber, and
- the response of the optical sensor is a measurement of a refractive index modulation modification of the portion of the optical fiber due to an elongation/compression of the portion of the optical fiber comprising the Bragg grating.

Optionally, the apparatus may further comprise an additional arm for transforming the radial displacement of the arm, the additional arm being coupled to first coupling point.

According to a second alternative of the first embodiment, the dimension measurement involves a Bragg grating working in elongation/compression due to the flexure of an arm supporting the Bragg grating. More precisely, the apparatus comprises:

- a flexible arm in contact with an internal wall of the well-bore, the arm being coupled with the optical fiber,
- an optical sensor comprising a Bragg grating inscribed in a portion of the optical fiber and positioned in/on the flexible arm, the portion of the optical fiber being coupled to the flexible arm by at least a first and a second coupling point, said coupling points encompassing said portion, so that a flexure of the flexible arm elongates/compresses the portion of the optical fiber, and
- the response of the optical sensor is a measurement of a refractive index modulation modification of the portion of the optical fiber comprising the Bragg grating due to an elongation/compression of the portion of the optical fiber comprising the Bragg grating.

According to a second embodiment of the invention, the optical caliper comprises a housing containing an absorbing fluid penetrated by a caliper arm in contact with the wall of the well-bore. The dimension measurement is based on the modulation of light intensity through an absorption measurement. More precisely, the apparatus comprises:

an optical sensor comprising a sealed housing filled with a light absorbing fluid and coupled to an optical fiber, an arm in contact with an internal wall of the well-bore, the arm being coupled with the sealed housing and comprising a mirror at an extremity of the arm in contact with the light absorbing fluid, the mirror facing an optical fiber extremity, and the response of the optical sensor is a reflected intensity of a light beam traveling from the optical fiber extremity through the absorbing fluid and reflected back to the optical fiber extremity by the mirror.

According to a third embodiment of the invention, the optical caliper comprises an optical element for emitting a beam towards the wall of the well-bore and detecting the position of the reflected light beam. The dimension measurement is based on the measurement of the reflected light beam position on a photo-detector surface. More precisely, the apparatus comprises:

a window and a reflecting element coupled with the optical fiber so that a light beam is emitted in direction to the internal wall of the well-bore with a particular angle through the window, the optical sensor comprising a space sensitive photo-detector receiving a reflected light beam from the internal wall of the well-bore, and the response of the optical sensor is a position of the reflected light beam on the space sensitive photo-detector.

The different embodiments of optical caliper according to the invention enable high resolution, small footprint, improved reliability, and can be used in harsh environment (e.g. high temperatures) where classical electronic devices are not operational anymore.

The optical caliper when used in a multi-arm application or in rotating caliper application allows scanning the diameter of the well-bore over the full circumference with a full coverage. Thus, the optical caliper provides information on the internal dimension of the well-bore, and also on its integrity (e.g. potential damage, corrosion phenomena or holes in the well-bore wall).

The optical caliper of the invention provides absolute position measurements and can be used for several applications, i.e. single caliper configuration or multi-arms caliper configuration.

Moreover, if the transmission wavelength is chosen properly, e.g. in the standard near IR transmission interval, the optical caliper can be used for remote sensing. Thus, all electronics for signal generation, acquisition and processing are on surface, while only passive optical elements are downhole.

In addition, the invention relates to a system for measuring an internal dimension of a well-bore. The system comprises a plurality of apparatus for measuring an internal dimension of a well-bore according to any of the embodiments, each apparatus being connected to at least one optical fiber and multiplexed.

Finally, the invention also relates a logging tool for measuring at least one parameter of a well-bore. The logging tool comprises at least one apparatus for measuring an internal dimension of a well-bore according to any of the embodiments.

BRIEF DESCRIPTION OF THE DRAWINGS

The present invention is illustrated by way of examples and not limited to the accompanying figures, in which like references indicate similar elements:

FIG. 2.A shows a tool comprising a caliper tool according to a first embodiment of the invention;

FIGS. 2.B and 2.C schematically illustrate the principle of the first embodiment of the invention;

DETAILED DESCRIPTION OF THE INVENTION

Figure 1:
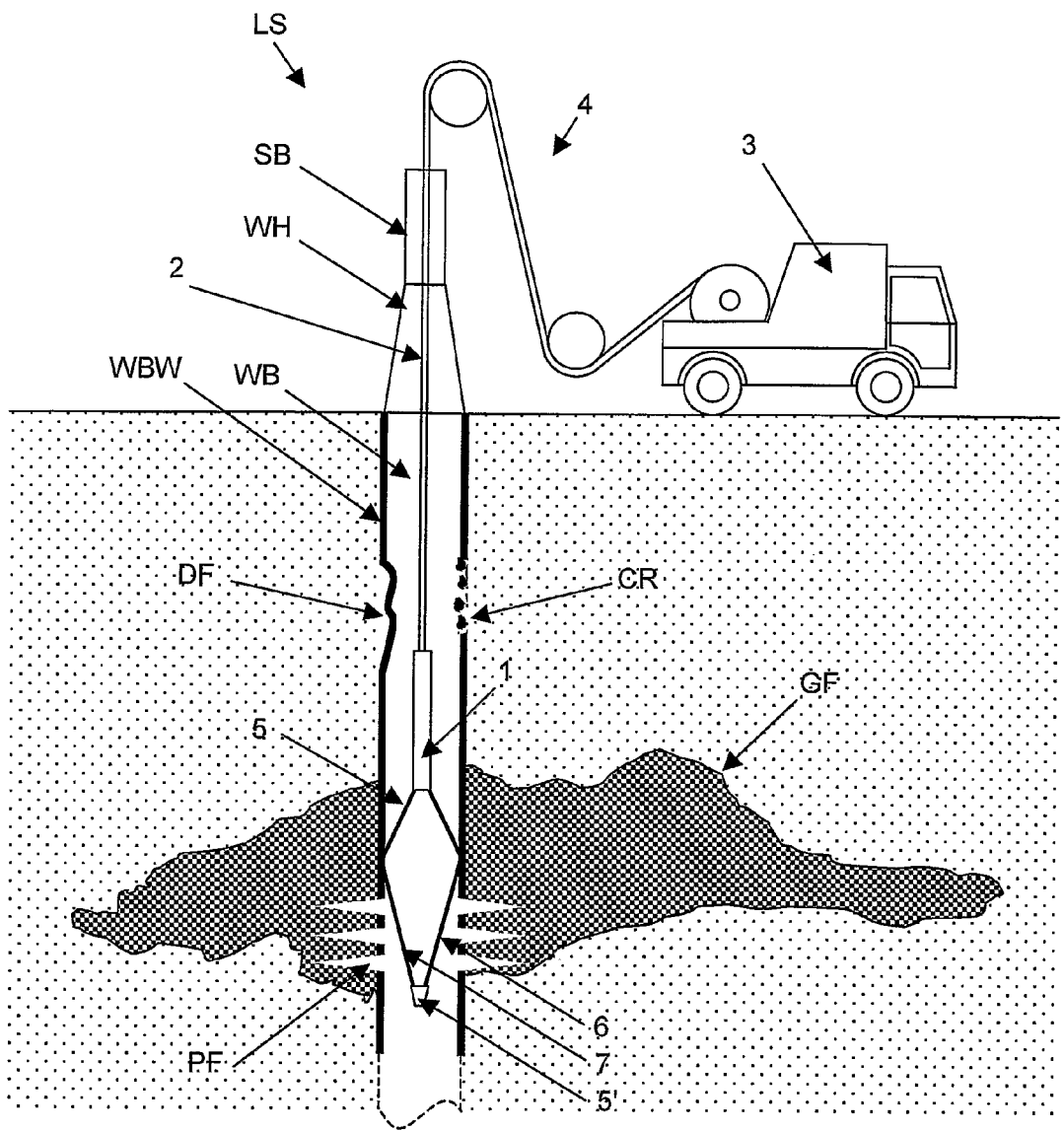
FIG. 1 schematically illustrates a logging system of the invention.

FIG. 1 schematically shows a logging system LS adapted to perform logging operations in a well-bore WB.

The well-bore may be a bore-hole, a casing or tubing. It may be subject to deformation DF, corrosion CR, perforation PF or the like that affects the well-bore wall WBW and consequently the internal dimension of the well-bore. The well-bore is generally provided with a well head WH and a stuffing box SB. The stuffing box provides a sealing for deploying the logging system in the well-bore, the well-bore being generally pressurized, while the logging system LS being generally partly under atmospheric pressure.

The logging system LS comprises a logging tool 1. Advantageously, the logging tool comprises a centralizer 5, generally comprising a plurality of mechanical arm 6, 7, etc. . . . connected to the tool 1 and to a bottom nose 5'. The mechanical arm can be deployed radially so as to be in contact with the well-bore wall, insuring a correct positioning of the tool within the well-bore (e.g. along the central axis of the well-bore). Additionally, the mechanical arms constitute caliper arms used for measuring the internal dimension (e.g. diameter) of the well-bore.

The logging tool is coupled to an optical fiber line 2 which is deployed inside the well-bore by an adapted surface unit (for example a vehicle 3 and a corresponding deploying system 4). Data related to a hydrocarbon geological formation GF or to the well-bore WB gathered by the logging tool 1 may be transmitted in real-time to the surface, for example to the vehicle 3 fitted with an appropriate data collection and analysis computer and software.

The optical fiber line 2 may be protected in a cable against potential harsh environment (corrosive fluid, high temperature and pressure, etc. . . . ) of the well-bore.

FIGS. 2.A, 2.B, 2.C and 3 relates to an optical caliper according to a first embodiment of the invention.

The first embodiment of the invention involves an optical sensor in which an incoming light is modulated as a function of the position of a caliper arm. A mechanical movement of the caliper arm induces a modification of the optical response of the optical sensor.

Advantageously, the optical sensor comprises an optical fiber, a portion of the optical fiber comprising a Bragg grating.

When coupled to the caliper arms, the optical sensor constitutes a transducer.

The optical fiber portion comprising the Bragg grating is coupled to the tool (e.g. tool body, the caliper arm) by at least two coupling points encompassing the Bragg grating so that any displacement of the caliper arm induces a modification of the distance between the two coupling points. The distance between the two coupling points is correlated to the position of the caliper arm, thus of the bore-hole dimension. The optical fiber portion comprising the Bragg grating coupled to the caliper arm is used to modulate the wavelength of light as a function of the position of the caliper arm within the bore-hole. The optical fiber carries the information, both the incoming light and the modulated output light.

The optical sensor can be "interrogated" all-optically and remotely from the surface unit. Alternatively, the optical fiber can also connect the transducer to an electronic circuit inside the tool. The electronic circuit performs the detection of the optical signal, processes the resulting electrical signal, and sent it to the surface unit by usual telemetry system.

According to the first alternative shown on FIGS. 2.A to 2.C, the elongation/compression of the optical fiber comprising the Bragg grating between the two coupling points is obtained by means of an additional arm.

Figure 3:
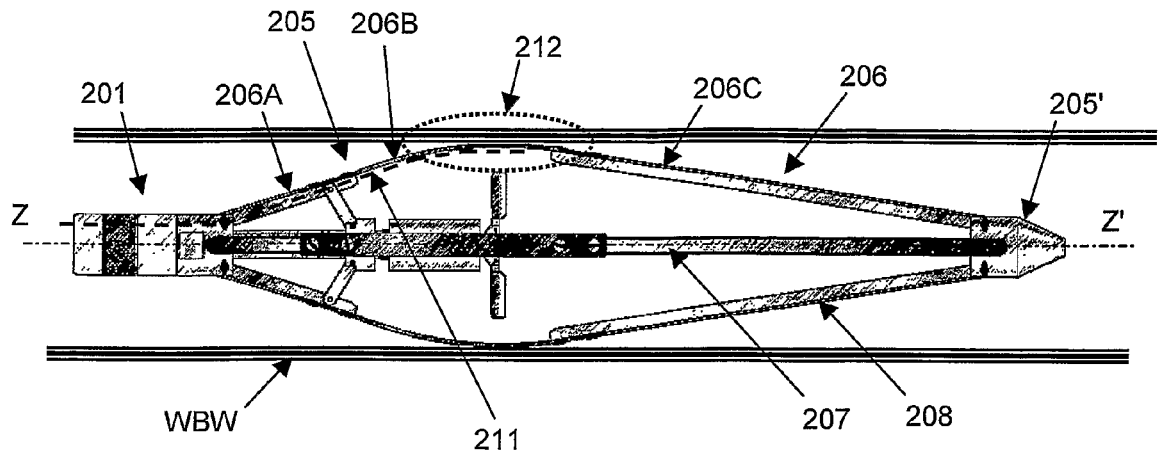
FIG. 3 shows a tool according to an alternative of the first embodiment of the invention.

According to a second alternative shown on FIG. 3, the elongation/compression of the optical fiber comprising the Bragg grating between the two coupling points is obtained by means of a flexible arm.

FIG. 2.A shows an optical caliper according to a first embodiment of the invention. The tool 101 comprises a centralizer 105. The centralizer 105 comprises four mechanical arms 106, 107, 108, 109 connected to the tool 101 and to a bottom nose 105' by pivot connections. Each mechanical arm can be deployed radially so as to be in contact with the well-bore wall WBW. For example, the mechanical arm 106 comprises a first part 106A connected through a pivot connection 106B to a second part 106C. The pivot connection 106B is in contact with the well-bore wall. The centralizer enables a positioning of the tool along the central axis ZZ' of the well-bore. The first part 106A is connected through a pivot connection to an additional arm 110. The additional arm is coupled to the optical fiber 111. The optical fiber is provided with a Bragg grating 112. The optical fiber is coupled to the additional arm 110 by a first coupling point CP1 and to a part of the tool 101 by a second coupling point CP2. The additional arm 110 transforms the radial displacement of the mechanical arm 106 into a translation movement that stretches the optical fiber 111 between the first CP1 and the second CP2 coupling points.

Advantageously, the optical fiber 111 may be attached by any possible attachment techniques, for example by glass frit soldering or gluing technique. In the above described example, the optical fiber is coupled to the tool 101 by means of the coupling point CP2. However, it will be apparent for a man skilled in the art that the same result can also be achieved by coupling more points, or coupling the optical fiber and the arm all along the fiber, provided that the optical fiber portion comprising the Bragg grating can stretch when the mechanical arm undergoes a movement.

In addition, in the above described example, the coupling points correspond to the two extremities of the Bragg grating. However, it will be apparent for a man skilled in the art that the same result can also be achieved when the coupling points are distant from the Bragg grating extremities provided that the coupling points CP1, CP2 are on either sides of the Bragg grating 112.

The optical caliper, which is functionally represented in FIGS. 2.B and 2.C, operates as follows.

For sake of clarity, FIGS. 2.B and 2.C only represent one arm 106.

The Bragg grating 112 is directly inscribed in the optical fiber 111. The Bragg grating is a modulation of the refractive index of the optical fiber 111. The optical fiber is connected to an appropriate light emission and detection apparatus (not shown) that emits a light beam having in a particular wavelength interval and detects the center wavelength of the reflected light. The center wavelength of the reflected light is determined by the pitch of the Bragg grating. Under the influence of strain, the index modulation is modified, which results in a shift of the center wavelength.

When the tool is run into the well-bore, the radial displacement of the arm 106 in contact with the well-bore wall is transformed into a translation by the additional arm 110. The end of the mechanical arm being attached to the optical fiber holding the Bragg grating, the Bragg grating elongates as a function of the caliper opening. FIG. 2.B shows a first elongation el1 corresponding to a well-bore wall WBW in normal condition, i.e. optimal internal dimension. FIG. 2.C shows a second elongation el2 corresponding to a well-bore wall WBW having a local deformation DF, i.e. reduced internal dimension. The translational displacement is then detected by detecting the shift of the center wavelength.

The mechanics of the various arms displacement have to be controlled in order to guaranty the accuracy of the measurement. Indeed, with a total length of fiber of 10 cm, the possible translational movement is less than about 1 mm (typical maximum elongation of a fiber is below 1%). Thus, the mechanics have to be controlled in order to provide a total excursion of the additional arm 110 of less than 1 mm.

A calibration may be performed to relate the elongation of the Bragg grating to the opening of the caliper arm.

FIG. 3 shows an optical caliper according to an alternative of the first embodiment of the invention.

The tool 201 comprises a centralizer 205. The centralizer 205 comprises four mechanical arms (three are visible in the Figure) 206, 207, 208 connected to the tool 201 and to a bottom nose 205' by pivot connections. Each mechanical arm can be deployed radially so as to be in contact with the well-bore wall WBW. For example, the mechanical arm 206 comprises a first part 206A, a second part 206B and a third part 206C. The second part 206B is a flexible part, for example a spring blade connected to the first 206A and third 206C part through appropriate connecting means (e.g. screw or the like). The second part 206B is in contact with the well-bore wall. The centralizer enables a positioning of the tool along the central axis ZZ' of the well-bore.

The mechanical arm 206 is coupled to the optical fiber 211 (shown as a dashed line). The optical fiber is provided with a Bragg grating 212 (zone of the Bragg grating circled with a dotted line). The optical fiber 211 can be attached directly to the arm 206. Alternatively, the optical fiber may be fitted within an appropriate groove, cavity, or hole (not shown) of the arm.

Preferably, the Bragg grating is directly attached on the spring blade 206B of the caliper arm 206 (for example by a gluing technique). The Bragg grating is directly affected by the flexure of the spring blade. The flexure is related to the opening of the caliper arms.

The Bragg grating 212 is directly inscribed in the optical fiber 211. The Bragg grating is a modulation of the refractive index of the optical fiber 211. The optical fiber is connected to an appropriate light emission and detection apparatus (not shown) that emits a light beam having in a particular wavelength interval and detects the center wavelength of the reflected light. The center wavelength of the reflected light is determined by the pitch of the Bragg grating. Under the influence of strain due to the flexure of the spring blade, the index modulation is modified, which results in a shift of the center wavelength.

The Bragg grating may also be packaged before being attached to the arm.

A calibration may be performed to relate the optical response of the Bragg grating to the opening of the caliper arm.

Figure 4:
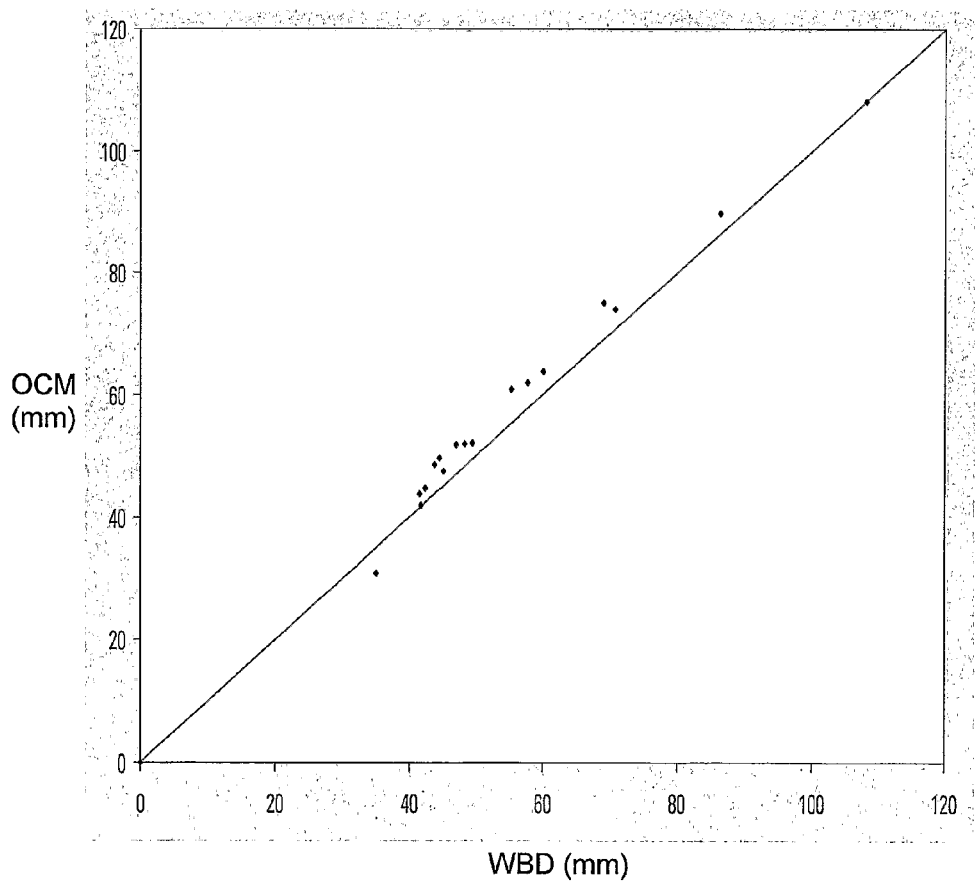
FIG. 4 represents a measurement example showing the correlation between the caliper opening and the strain measured with the tool according to the alternative of FIG. 3.

FIG. 4 represents a measurement example showing the correlation between the optical caliper measurements OCM (each measurement is represented by a dot) and the well-bore diameter WBD (represented as a line) measured with the hereinbefore described optical calipers along a well-bore wall.

In both configurations described hereinbefore, it is to be noted that Bragg grating index is dependent on temperature. Consequently, it is possible to compensate for temperature change when dimension measurements are made in temperature changing environment. Any sensor may be used to perform temperature measurement, in particular a Bragg grating temperature sensor can be used to measure the temperature and compensate the deformation of the optical caliper.

Both optical caliper configurations described hereinbefore can be placed on at least one arm of a multi-arms tool or a multi-finger caliper tool. Advantageously, multiplexing technique is used to perform all the measurements (strain measurements and temperature measurement for determination of well temperature and compensation of the optical caliper) with one or more optical fiber(s) connected to the surface unit. This might be implemented by using a series of couplers or multiplexers distributing the optical calipers on different optical fibers within the tool. Another configuration implements many sensors per optical fiber, all sensors being distributed on at least one optical fiber over the tool.

In the hereinbefore described first embodiment, the connection between the bottom nose and the arms or between the arms and the tool is a pivot connection. However, any other kind of connections can be used: hinge, self-aligning bearings, rabbet joint, slides, etc. . . . In addition, the rigid or flexible arms are only given as example and can be replaced by any other mechanical element (e.g. a leaf spring) having the same functionality.

Figure 5:
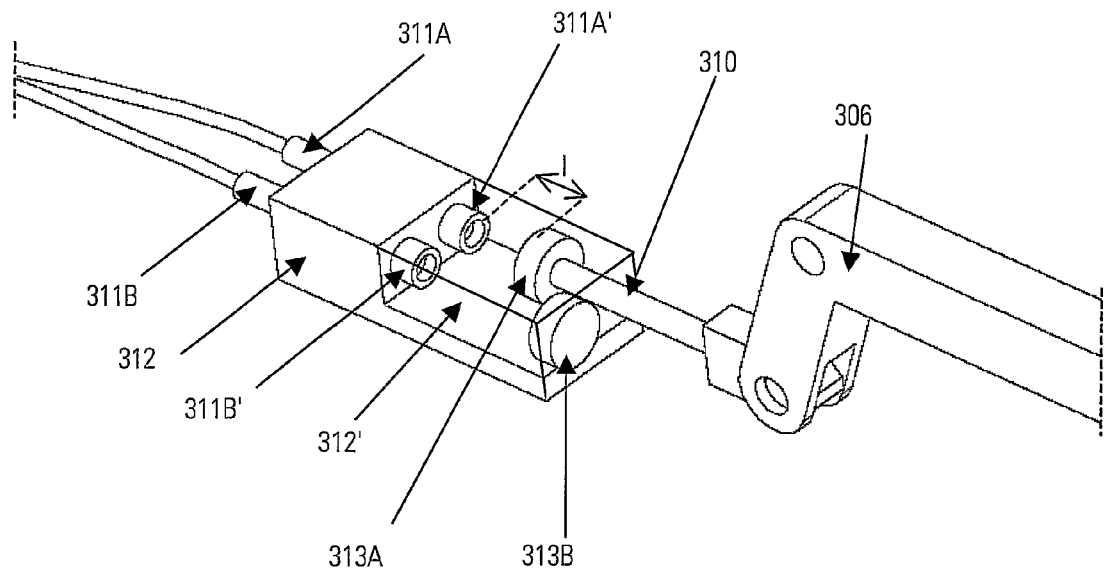
FIG. 5 schematically illustrates the optical sensor according to a second embodiment of the invention.

FIG. 5 schematically illustrates the optical sensor according to a second embodiment of the invention.

The second embodiment of the invention involves an optical sensor in which the absorption of a light beam traveling into an absorbing fluid depends on the position of a caliper arm.

In a way analogous to the one described in relation with FIGS. 2, the radial displacement of a caliper arm 306 in contact with an internal wall of the well-bore (not shown) is transformed into a translation displacement by an additional arm 310.

The optical sensor comprises a sealed housing 312 fill with a light absorbing fluid 312' and coupled to an optical fiber 311A. The sealed housing 312 is positioned within the logging tool. The additional arm 310 is coupled with the sealed housing 312, an extremity of the arm penetrating into the sealed housing. The additional arm comprises a mirror 313A at an extremity in contact with the light absorbing fluid 312', the mirror facing an optical fiber extremity 311A'. The mirror is deposited or attached at the end of additional arm so as to reflect the incoming light beam of the optical fiber.

The response of the optical sensor is a reflected intensity of a light beam traveling from the optical fiber extremity through the absorbing fluid and reflected back to the optical fiber extremity by the mirror.

Advantageously, a reference optical fiber 311B is also coupled to the sealed housing 312 and provides an optical beam as a reference beam. The reference beam is reflected by a second mirror 313B attached to the opposite side of the housing facing an optical fiber extremity 311B'. The reference beam compensates all effects which can affect the absolute intensity measurement (variation of refractive index and absorption coefficient of the fluid with temperature and pressure, variation of the fluid properties due to use, variation of cable or connectors attenuation, etc. . . . ).

The two optical fibers can be coupled together with an optical coupler (not shown). The measurement beam and the reference beam may be coded on two different wavelengths using for example WDM technique (wavelength division multiplexing). However, it will be apparent for a man skilled in the art that this can also be achieved through others multiplexing techniques, for example TDM technique (time domain multiplexing).

The intensity-based measurement of the caliper opening operates as follows.

The measurement beam undergoes a linearly variable attenuation through the absorbing fluid. The attenuation depends on path length of the measurement beam in the housing, said path length depending on the position of the additional arm mirror in the housing (this position being directly related to the caliper opening).

The fluid medium is selected such as its absorption coefficient in the wavelength interval of the incoming light is generating an optical signal of large dynamic range (e.g. covering the minimum and maximum excursion of the additional arm). The absorption due to the fluid is following the Beer Lambert law: $A = \epsilon \times l \times c$ where A is the absorbance, $\epsilon$ is the molar absorbtivity, l is the path length of the optical beam through the fluid and c is the concentration of the absorbing species.

Alternatively, other light absorbing fluids not following the Beer Lambert law can be used.

The reference beam is used to calibrate for variable losses.

Both the reference and measurement beams are travelling through the absorbing fluid to their respective mirror and reflected back on the mirror to their respective optical fiber.

The light beam travelling length in the housing changes when the caliper arm is translated. The absorption varies linearly with the displacement of the additional arm. Advantageously, for the minimum excursion of the caliper arm, the absorption of the measurement beam is equivalent to the absorption of the reference beam. For the maximum excursion, the absorption of the measurement beam is less important than the absorption of the reference beam (the optical beam travels a reduced thickness of absorbing fluid). The relationship between translation of the arm and measured absorption is linear.

The second embodiment also allows multiplexing a plurality of optical calipers. In particular, different caliper arms can be coded on different wavelengths. Advantageously, a single reference beam can be used for all optical caliper measurements.

The hereinbefore described first and second embodiments provide an absolute position measurement of a mechanical arm and are well adapted to be used in a caliper tool for oilfield applications.

Due to the small footprint of the optical measurement, the optical caliper provides a compact tool.

Additionally, the optical caliper is electronic-less (the parts present in the bore-hole) and can be interrogated remotely via an optical fiber. Consequently, the optical caliper is more reliable than prior art caliper, in particular in harsh environment.

Figure 6:
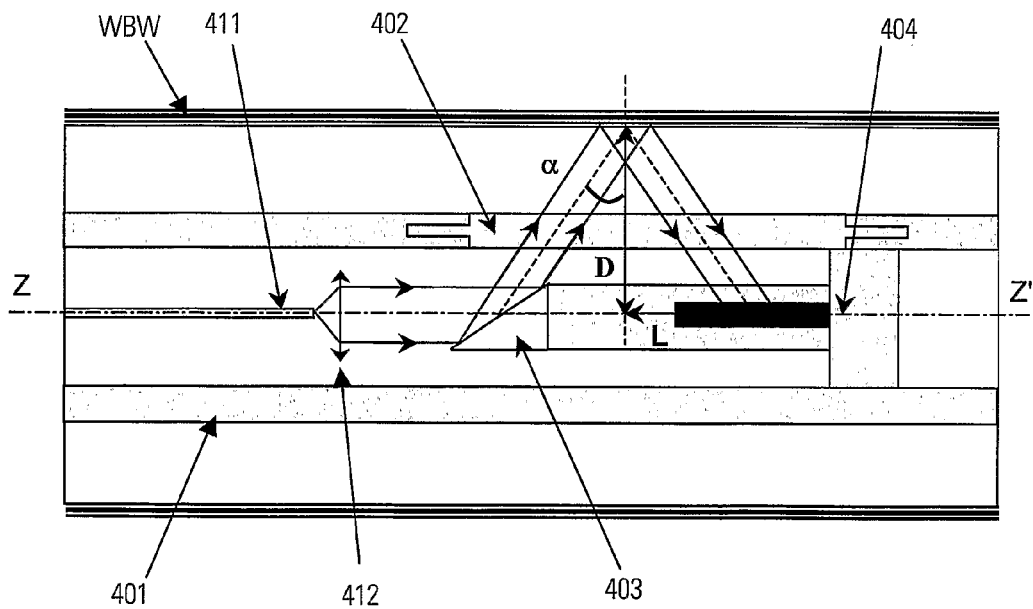
FIG. 6 schematically illustrates the optical sensor according to a third embodiment of the invention.

FIG. 6 schematically illustrates the optical sensor according to a third embodiment of the invention.

The third embodiment of an optical caliper according to the invention involves an optical sensor emitting a light beam towards the well-bore wall and measuring a position of the reflected light beam on a space sensitive photo-detector.

The optical caliper comprises a window 402. The window 402 is made in a wall of the tool 401. The window may be substantially parallel to an internal wall of the well-bore WBW.

The optical caliper further comprises a reflecting element 403 coupled with an optical fiber 411 through a collimating element 412. The optical caliper emits a collimated light beam in direction to the internal wall of the well-bore with a particular angle α (by convention angle α is the angle existing between the light beam and a perpendicular to the well-bore wall) through the window. The light beam is reflected by the well-bore wall towards the window 402. The optical caliper comprises an optical sensor 404 positioned behind the window within the tool 401. The optical sensor 404 comprises a space sensitive photo-detector receiving the reflected light beam from the internal wall of the well-bore.

The reflected beam position L on photo-detector is given by $L=D\tan(\alpha)$. For a given value of the particular angle α, the position L of the beam spot on the photo-detector gives a measurement of a distance D between the photo-detector and the well-bore wall. The distance D enables to determine the internal dimension of the well bore depending on the known position of the photo-detector within the tool.

As an example, for α=30° and L=12 mm, the well bore diameter 2D is 43 mm, and for L=51 mm, the well-bore diameter is 178 mm. A variation of 1 mm of the distance D results in a beam displacement ΔL of 288 microns. In this example, a photo-detector comprising 200 detectors with a size smaller than 200 microns each, stacked together on a photodiodes array or CCD (charge coupled device) allows measurements of well bore diameter from 43 mm to 178 mm. It will be apparent for a man skilled in the art that the device characteristics could be adapted to extended diameter ranges.

In order to avoid attenuation of light beam by fluids, the optical caliper according to the third embodiment is preferably used for well-bore containing clear fluid (e.g. gas well).

A particular application of the invention relating to an optical caliper for an application to a hydrocarbon well has been described. However, the invention is also applicable for the measurement of any internal diameter of any pipe (water pipe, sewer pipe, etc. . . . ).

The drawings and their description hereinbefore illustrate rather than limit the invention.

Any reference sign in a claim should not be construed as limiting the claim. The word "comprising" does not exclude the presence of other elements than those listed in a claim. The word "a" or "an" preceding an element does not exclude the presence of a plurality of such element.

The invention claimed is:

1. A tool adapted to be positioned inside a well-bore wherein the tool comprises an apparatus for measuring an internal dimension of the well-bore, the apparatus comprising:

an optical caliper comprising an optical sensor providing a response correlated to the internal dimension of the well-bore, the optical sensor being coupled to an optical fiber and coupled to a caliper arm in contact with a wall of the well-bore;

wherein the optical sensor comprises a Bragg grating inscribed in a portion of the optical fiber, the caliper arm being coupled to the portion of the optical fiber by a first coupling point so that a movement of the caliper arm elongates/compresses the portion of the optical fiber; and wherein the response of the optical sensor is a measurement of a refractive index modulation modification of the portion of the optical fiber comprising the Bragg grating due to an elongation/compression of said portion of the optical fiber.

2. The apparatus for measuring an internal dimension of a well-bore according to claim 1, wherein the apparatus further comprises an additional arm for transforming the radial displacement of the caliper arm, the additional arm being coupled to first coupling point.

3. The apparatus for measuring an internal dimension of a well-bore according to claim 1, wherein the apparatus comprises:

a flexible caliper arm in contact with an internal wall of the wellbore, the flexible caliper arm being coupled with the optical fiber, the optical sensor comprising a Bragg grating inscribed in a portion of the optical fiber and positioned in/on the flexible caliper arm, the portion of the optical fiber being coupled to the flexible caliper arm by at least a first and a second coupling point, said coupling points encompassing said portion of the optical fiber, so that a flexure of the flexible caliper arm elongates/compresses the portion of the optical fiber, and the response of the optical sensor is a measurement of a refractive index modulation modification of the portion of the optical fiber comprising the Bragg grating due to an elongation/compression of said portion of the optical fiber.

4. A system for measuring an internal dimension of a well-bore, wherein the system comprises a plurality of apparatus for measuring an internal dimension of a well-bore according to claim 1, each apparatus being connected to at least one optical fiber and multiplexed.

5. The tool of claim 1 adapted to be positioned inside a well-bore, wherein the tool is a logging tool for measuring at least one parameter of a well-bore and wherein the logging tool comprises at least one apparatus for measuring an internal dimension of a well-bore.

* * * * *